Patented Apr. 27, 1943

2,317,455

UNITED STATES PATENT OFFICE 2,317,455

PURIFYING BENZOIC ACID

Ivan Gubelmann, Wilmington, Del., and Roland G. Benner, Carneys Point, N. J., assignors to E. I. du Pont de Nemours & Company, Wilmington, Del., a corporation of Delaware No Drawing. Application June 27, 1940,
Serial No. 342,662

11 Claims. (Cl. 260—525)

This invention relates to methods of purifying benzoic acid and particularly benzoic acid prepared by the catalytic oxidation of toluene.

Most of the benzoic acid produced heretofore has been made by the decarboxylation of phthalic acid. Recently, considerable progress has been made in the production of benzoic acid by methods involving the catalytic oxidation of toluene with air or oxygen-containing gas.

D. J. Loder, in his application Serial No. 235,578 filed October 18, 1938, has disclosed a particularly successful method whereby alkyl substituted aromatic compounds, particularly toluene, in a suitable solvent, such as acetic acid, are oxidized in the liquid phase by means of an oxygen-containing gas in the presence of a cobalt catalyst at high temperatures. Since the two processes are quite different, different by-products and impurities are formed which have made it necessary to evolve new methods of purifying benzoic acid made by the catalytic oxidation of toluene.

It is an object of the present invention to provide new methods for purifying benzoic acid obtained by the catalytic oxidation of toluene with air or other oxygen-containing gases. Another object is to provide a two step method of purifying benzoic acid obtained by the catalytic oxidation of toluene, each of which steps are novel and may be employed separately to obtain desirable results. A further object is to provide methods of purifying benzoic acid obtained by the catalytic oxidation of toluene, which will produce higher yields of purer benzoic acid. Other objects are to advance the art. Still other objects will appear thereinafter.

The above and other objects may be accomplished in accordance with our invention which comprises washing an oxidation mass, obtained by the catalytic oxidation of toluene in a solvent, with a dilute aqueous solution of a small proportion of a basic reacting material at temperatures between the freezing point and the boiling point of the oxidation mass and subsequently distilling the crude benzoic acid in the presence of a small proportion of sulfuric acid. While the main object of our invention will preferably be obtained by such combination of steps, other objects of our invention may be accomplished by the use of either step alone. These methods of our invention are particularly adapted to the purification of benzoic acid contained in oxidation masses, obtained by the method of Loder in his application Serial No. 235,578 hereinbefore referred to.

The nature and constitution of the by-products and impurities, in the oxidation mass formed by the catalytic oxidation of toluene to benzoic acid, have not been determined. They are quite complex mixtures and have not proved amenable to ready identification. We have found that some of them, particularly the most undesirable, may be washed out of the oxidation mass with an aqueous solution of a basic reacting material. If such impurities are not removed prior to distillation of the benzoic acid from the reaction mass, sodium benzoate, prepared from the distilled benzoic acid, is of inferior quality. A saturated solution, containing 5 grams of U. S. P. sodium benzoate, should remain clear after the addition of 35 cc. of methanol. Benzoic acid, obtained by distillation from an oxidation mass which has been washed with an alkaline solution in accordance with our invention, can be converted to sodium benzoate of U. S. P. quality, without further purification, by dissolving it in sodium bicarbonate solution and drying the resulting solution after clarification with activated carbon. If such washing treatment is omitted, the sodium benzoate is of inferior quality and a saturated solution thereof, containing 5 grams of such sodium benzoate, becomes very turbid on addition of 35 cc. of methanol.

The step of washing the oxidation mass should usually be carried out at temperatures between the freezing point and the boiling point of the oxidation mass, that is, at temperatures above the freezing point and below the boiling point. This temperature range will vary with different oxidation masses, but will usually be from about 50° C. to about 80° C. After the washing step, the oxidation mass will ordinarily be distilled, whereupon a lower boiling fraction, containing benzaldehyde, benzyl alcohol, benzyl acetate and a small amount of benzoic acid, will generally distill off first and then the main fraction of the benzoic acid will be distilled off.

While caustic soda or sodium hydroxide is the preferred basic material to be employed in the washing step, any other basic material, which will react with acetic acid to form water-soluble salts therewith, will be found to be suitable and the term "basic reacting material," as employed herein and in the claims, will have such meaning. The basic reacting materials may be of the classes of free bases, hydroxides and oxides of the alkali and alkaline earth metals and salts of weak acids and strong bases. Examples of such basic materials are, potassium hydroxide, ammonium hydroxide, calcium hydroxide, barium hydroxide, sodium carbonate, potassium carbonate, sodium acetate, calcium acetate, potassium acetate, sodium benzoate, potassium benzoate, trisodium phosphate, sodium butyrate, potassium butyrate and the like. We have discovered that such basic materials will react with the most objectionable impurities in preference to the benzoic acid and also in preference to aliphatic acids, such as acetic acid, when such aliphatic acids are employed as solvents, and will remove such impurities from the oxidation mass. This is an unobvious result which was not to be expected and which could not have been predicted.

The amount of the basic reacting material in the solution, employed for washing the oxidation mass, will depend upon the amounts of impurities in the mass. We prefer to employ small proportions of the basic reacting materials so that no appreciable amounts of the benzoic acid are converted to salts. The amount of basic reacting material employed will generally be from about 0.001 to about 0.3 of a chemical equivalent for each mole of the benzoic acid. Preferably, we employ from about 0.015 to about 0.03 of a chemical equivalent of the basic reacting material for each mole of the benzoic acid. The amount of water employed, in producing the solution of basic reacting material for washing the oxidation mass, should be such that the solution is dilute, that is, that the solution contains the basic reacting material in a concentration of less than 50%. Water is formed during the oxidation and, in some cases, no additional water need be added. However, better results are obtained if some water is added with the basic reacting material, and preferably sufficient so that the concentration of the basic reacting material in the solution falls within the range of from 0.5% to about 10%.

The benzoic acid, in oxidation mass, may also be purified by adding thereto a small proportion of sulfuric acid and then fractionally distilling the mass to recover purified benzoic acid. Usually, it will be found desirable to distill off the more volatile constituents of the oxidation mass, such as benzaldehyde, benzyl alcohol and benzyl acetate, prior to the addition of the sulfuric acid, in order to recover benzaldehyde which otherwise would be destroyed by the sulfuric acid. The benzoic acid may be distilled, after the addition of the sulfuric acid, without any prolonged treatment with the sulfuric acid. However, it will generally be preferred to reflux the oxidation mass in the presence of the sulfuric acid for a short period of time, up to about one hour, before carrying out the distillation step. The refluxing may be carried out over longer periods of time but without material advantage. Preferably, the refluxing will be continued over a period of approximately 30 minutes. Such refluxing results in a higher yield of purified material than is obtained if the refluxing step is omitted. Such treatment with sulfuric acid may be carried out, without the preliminary washing step with a basic reacting material, to obtain purified benzoic acid which will be useful for many purposes, but which will not generally be suitable for making sodium benzoate of U. S. P. quality without further purification. Benzoic acid, obtained by distillation from sulfuric acid, has a freezing point of 0.5° C. to 1.0° C. higher than benzoic acid obtained by distillation in the absence of the sulfuric acid.

The amount of sulfuric acid, to be added to the crude benzoic acid before distillation, may vary from about 0.1% to 20% of the weight of the benzoic acid. Preferably, we employ from about 0.5% to 2% of sulfuric acid based on the benzoic acid. Sulfuric acid of any concentration may be employed since the water will boil off during the first stage of the distillation to leave concentrated sulfuric acid in the oxidation mass during the distillation of the benzoic acid. It will generally be preferred to add concentrated sulfuric acid to the oxidation mass prior to the start of distillation. By concentrated sulfuric acid, we mean sulfuric acid of 50% to 100% strength or greater. For example, sulfuric acid, containing dissolved sulfur trioxide, known as oleum, may be employed. Particularly, we prefer to employ sulfuric acid of about 98% concentration.

While, as has been pointed out hereinbefore, benzoic acid of improved purity and quality may be obtained by employing either the washing step or the sulfuric acid distillation step alone, we have found that the best results are obtained if the steps are combined in a single process comprising washing the oxidation mass with the solution of the basic reacting material, then distilling off the more volatile constituents of the oxidation mass, then adding sulfuric acid to the crude benzoic acid so produced, and then distilling off the purified benzoic acid. By such procedure, benzoic acid of higher purity and higher freezing point is obtained which is particularly adapted for making sodium benzoate of U. S. P. quality.

In order to more clearly illustrate our invention, the preferred modes of carrying the same into effect and the advantageous results to be obtained thereby, the following examples are given:

*Example 1*

Air was passed through a solution of 1340 parts of toluene in 120 parts of acetic acid in the presence of 1.2 parts of cobaltous acetate and 0.25 part of lead acetate at 180 to 220° C. and at about 750 pounds pressure. About 1500 parts of oxidation mass, containing about 550 parts of benzoic acid, were obtained. The oxidation mass is distilled until the constituents, which boil lower than benzoic acid, have been removed. 5 parts of 98% sulfuric acid are then added to the distillation residue which is fractionated under vacuum. The main fraction has a freezing point of about 122° C. It is colorless in the molten state but is not suitable for making sodium benzoate of U. S. P. quality without further purification, however, it is suitable for many other purposes.

*Example 2*

1500 parts of an oxidation mass, obtained as described in Example 1, is washed with 200 parts of 2% caustic soda solution. The upper layer is distilled at atmospheric pressure until the unreacted toluene has been removed and is then fractionated under vacuum. After removal of a lower boiling fraction containing benzaldehyde, benzyl alcohol, benzyl acetate, and a small amount of benzoic acid, the main fraction of benzoic acid is collected. The main fraction has a freezing point of 121 to 122° C. and is suitable for making sodium benzoate of U. S. P. quality without further purification.

*Example 3*

1500 parts of an oxidation mass, obtained as described in Example 1, was agitated with 200 parts of 2% caustic soda solution at 60 to 70° C. for several minutes, after which, the lower aqueous layer was drawn off. The lower layer contained a small amount of benzoic acid which was recovered by extraction with toluene. The upper layer was distilled to remove the toluene and then fractionated under vacuum to recover benzaldehyde, benzyl alcohol and benzyl acetate. After removal of these materials, 5 parts of 98% sulfuric acid was added to the still residue which was crude benzoic acid. The mass was refluxed for about 30 minutes and then the benzoic acid was distilled. The main fraction had a freezing point of above 122° C. and was suitable for making sodium benzoate of U. S. P. quality without further purification.

It will be understood that the above examples are given for illustrative purposes only and that many variations and modifications may be made therein, as pointed out hereinbefore in the specification. Still other modifications and variations, which may be made in our process without departing from the spirit of our invention, will be apparent to those skilled in the art. Accordingly, our invention is not to be limited by the specific embodiments given in the examples, but we intend to cover our invention broadly as in the appended claims.

We claim:

1. In the process of purifying benzoic acid in an oxidation mass, obtained by the catalytic oxidation of toluene in a solvent, the steps which comprise adding a small proportion of sulfuric acid to the crude benzoic acid and then fractionally distilling to recover purified benzoic acid.

2. In the process of purifying benzoic acid in an oxidation mass, obtained by the catalytic oxidation of toluene in a solvent, the steps which comprise distilling off components of the oxidation mass which are more volatile than benzoic acid, then adding a small proportion of sulfuric acid to the crude benzoic acid and then fractionally distilling to recover purified benzoic acid.

3. In the process of purifying benzoic acid in an oxidation mass, obtained by the catalytic oxidation of toluene in a solvent, the steps which comprise washing the oxidation mass with a dilute aqueous solution of a small proportion of an alkaline material at temperatures between the freezing point and the boiling point of the oxidation mass, then adding a small proportion of sulfuric acid to the crude benzoic acid and then fractionally distilling to recover purified benzoic acid.

4. In the process of purifying benzoic acid in an oxidation mass, obtained by the catalytic oxidation of toluene in a solvent, the steps which comprise washing the oxidation mass with a dilute aqueous solution of a small proportion of an alkaline material at temperatures between the freezing point and the boiling point of the oxidation mass, then distilling off components of the oxidation mass which are more volatile than benzoic acid, then adding a small proportion of sulfuric acid to the crude benzoic acid and then fractionally distilling to recover purified benzoic acid.

5. In the process of purifying benzoic acid in an oxidation mass, obtained by the catalytic oxidation of toluene in a solvent, the steps which comprise washing the oxidation mass with a dilute aqueous solution of a small proportion of an alkali metal base at temperatures between the freezing point and the boiling point of the oxidation mass, then adding a small proportion of sulfuric acid to the crude benzoic acid and then fractionally distilling to recover purified benzoic acid.

6. In the process of purifying benzoic acid in an oxidation mass, obtained by the catalytic oxidation of toluene in a solvent, the steps which comprise washing the oxidation mass with a dilute aqueous solution of a small proportion of an alkali metal base at temperatures between the freezing point and the boiling point of the oxidation mass, then distilling off components of the oxidation mass which are more volatile than benzoic acid, then adding a small proportion of sulfuric acid to the crude benzoic acid then fractionally distilling to recover purified benzoic acid.

7. In the process of purifying benzoic acid in an oxidation mass, obtained by the catalytic oxidation of toluene in a solvent, the steps which comprise washing the oxidation mass with a dilute aqueous solution of from about 0.015 to about 0.03 chemical equivalent of an alkali metal base at temperatures between the freezing point and the boiling point of the oxidation mass, then distilling off components of the oxidation mass which are more volatile than benzoic acid, then adding a small proportion of sulfuric acid to the crude benzoic acid and then fractionally distilling to recover purified benzoic acid.

8. In the process of purifying benzoic acid in an oxidation mass, obtained by the catalytic oxidation of toluene in a solvent, the steps which comprise washing the oxidation mass with a dilute aqueous solution of a small proportion of an alkaline material at temperatures between the freezing point and the boiling point of the oxidation mass, then refluxing the crude benzoic acid for a short period of time in the pressure of a small proportion of concentrated sulfuric acid and then fractionally distilling to recover purified benzoic acid.

9. In the process of purifying benzoic acid in an oxidation mass, obtained by the catalytic oxidation of toluene in a solvent, the steps which comprise washing the oxidation mass with a dilute aqueous solution of a small proportion of an alkaline material at temperatures between the freezing point and the boiling point of the oxidation mass, then distilling off components of the oxidation mass which are more volatile than benzoic acid, then refluxing the crude benzoic acid for a short period of time in the presence of a small proportion of concentrated sulfuric acid and then fractionally distilling to recover purified benzoic acid.

10. In the process of purifying benzoic acid in an oxidation mass, obtained by the catalytic oxidation of toluene in a solvent, the steps which comprise washing the oxidation mass with a dilute aqueous solution of a small proportion of an alkali metal base at temperatures between the freezing point and the boiling point of the oxidation mass, then distilling off components of the oxidation mass which are more volatile than benzoic acid, then refluxing the crude benzoic acid for a short period of time in the presence of a small proportion of concentrated sulfuric acid and then fractionally distilling to recover purified benzoic acid.

11. In the process of purifying benzoic acid in an oxidation mass, obtained by the catalytic oxidation of toluene in a solvent, the steps which comprise washing the oxidation mass with a dilute aqueous solution of a small proportion of sodium hydroxide at temperatures between the freezing point and the boiling point of the oxidation mass, then distilling off components of the oxidation mass which are more volatile than benzoic acid, then refluxing the crude benzoic acid for a short period of time in the presence of a small proportion of concentrated sulfuric acid, and then fractionally distilling to recover purified benzoic acid.

IVAN GUBELMANN.
ROLAND G. BENNER.